(12) United States Patent  
Maier

(10) Patent No.: US 8,331,638 B2  
(45) Date of Patent: Dec. 11, 2012

(54) CREATION OF MOTION COMPENSATED MRI M-MODE IMAGES OF THE MYOCARDIAL WALL

(75) Inventor: Corinna Maier, Neuried (DE)

(73) Assignee: Siemens Corporation, Iselin, NJ (US)

( * ) Notice: Subject to any disclaimer, the term of this patent is extended or adjusted under 35 U.S.C. 154(b) by 644 days.

(21) Appl. No.: 12/565,896

(22) Filed: Sep. 24, 2009

(65) Prior Publication Data

US 2010/0092059 A1   Apr. 15, 2010

Related U.S. Application Data

(60) Provisional application No. 61/104,281, filed on Oct. 10, 2008.

(51) Int. Cl.
*G06K 9/00* (2006.01)

(52) U.S. Cl. .................................................. 382/128

(58) Field of Classification Search ............... 382/128
See application file for complete search history.

(56) References Cited

U.S. PATENT DOCUMENTS

| | | | | |
|---|---|---|---|---|
| 5,065,435 A * | 11/1991 | Oe | ................. | 382/107 |
| 5,797,396 A * | 8/1998 | Geiser et al. | ................. | 600/407 |
| 6,301,498 B1 * | 10/2001 | Greenberg et al. | ............. | 600/425 |
| 7,047,061 B2 * | 5/2006 | Breeuwer | ..................... | 600/410 |
| 7,327,862 B2 * | 2/2008 | Murphy et al. | ................. | 382/128 |
| 7,450,746 B2 * | 11/2008 | Yang et al. | ..................... | 382/131 |
| 7,603,154 B2 * | 10/2009 | Noble et al. | ................... | 600/407 |
| 7,831,081 B2 * | 11/2010 | Li | ................................... | 382/131 |
| 2002/0072671 A1 * | 6/2002 | Chenal et al. | ................. | 600/450 |
| 2004/0197015 A1 * | 10/2004 | Fan et al. | ....................... | 382/128 |
| 2007/0135705 A1 * | 6/2007 | Lorenz et al. | ................. | 600/410 |

OTHER PUBLICATIONS

Unser et al., "Automated extraction of serial myocardial borders from M-mode Echocardiograms," IEEE Transactions on Medical Imaging 8(1) 96-103 (1989).*

Kanzaki et al., "Regional heterogeneity of left ventricular myocardial work quantified using anatomical M-mode echocardiography," Basic Research in Cardiology. New York: May 2004. vol. 99, Iss. 3; p. 204.*

* cited by examiner

*Primary Examiner* — Luke Gilligan
*Assistant Examiner* — Robert Sorey
(74) *Attorney, Agent, or Firm* — Donald B. Paschburg

(57) ABSTRACT

A method for displaying medical image data includes receiving medical image data including a myocardium. An endocardial contour is automatically segmented from the received medical image data. A center of mass of the automatically segmented endocardial contour is determined. A plurality of equiangular projections is defined beginning from the center of mass and projecting outwardly and cross the endocardial contour. A plurality of normal projections that correspond to the plurality of equiangular projections is defined. Each normal projection begins from an end of a corresponding equiangular projection and extends for a predetermined length, crossing the endocardial contour at a right angle. Dynamics of the myocardium along each normal projection are displayed as a function of time.

13 Claims, 5 Drawing Sheets

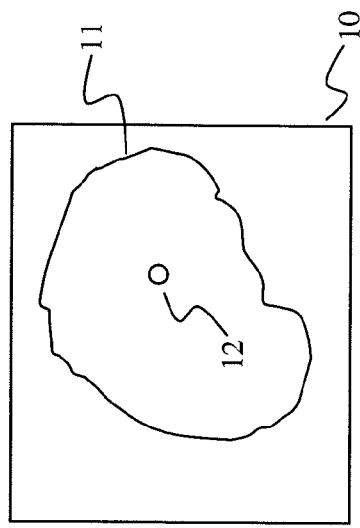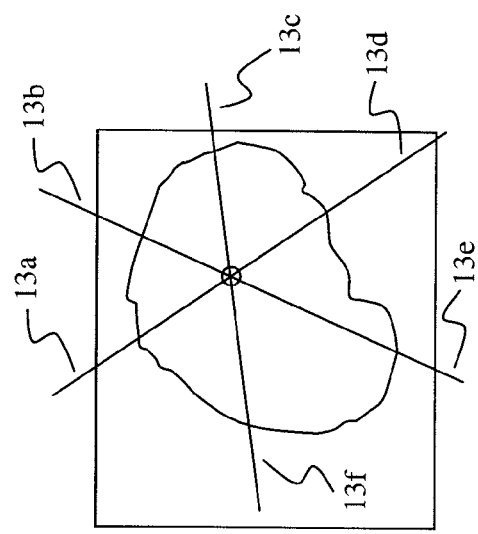
FIG. 2A
FIG. 2B

CREATION OF MOTION COMPENSATED MRI M-MODE IMAGES OF THE MYOCARDIAL WALL

CROSS-REFERENCE TO RELATED APPLICATION

The present application is based on provisional application Ser. No. 61/104,281, filed Oct. 10, 2008, the entire contents of which are herein incorporated by reference.

BACKGROUND OF THE INVENTION

1. Technical Field

The present disclosure relates to motion compensation MRI and more specifically, to the creation of motion compensated MRI M-Mode images of the myocardial wall.

2. Discussion of Related Art

Coronary artery disease (CAD) is a major cause of death in the western world. Several diagnostic tests are available for patients suspected of having CAD. One such test is a cardiac stress test using MRI. MRI is often preferential to x-ray based imaging techniques because of the risks associated with exposure to ionizing radiation. Therapies such as cardiovascular catheter-based intervention may be used to treat patients suffering from CAD. Research is currently underway to use MRI to provide image guidance to aid in the performance of interventional procedures such as cardiovascular catheter-based intervention so that current x-ray based imaging techniques such as fluoroscopy may be replaced.

However, conventional MRI-based electrocardiograms (ECG) do not deliver the full range of diagnostically relevant information that may be provided by other imaging modalities. One such modality is the M-Mode echocardiogram.

The M-Mode echocardiogram is a visualization technique that uses ultrasound to produce an image of the human heart. However, unlike the conventional two-dimensional ultrasound that produces a two-dimensional image of an area of interest including the heart, the M-Mode echocardiogram captures image data concerning a single ray through the myocardial region and thus essentially entails one-dimensional image data that has excellent axial resolution. The image information of this single ray is captured in real-time and displayed sequentially to produce an image that tracks the motion of the myocardial region over time. The M-Mode echocardiogram may be used to provide information of a high diagnostic value.

Magnetic resonance imaging (MRI) is increasingly used to image the human body, and in particular the myocardial region. However, MRI is generally used to produce a two or three-dimensional image. Accordingly, the diagnostic information that may be obtained from the M-Mode echocardiogram is not generally available from medical image data obtained using an MRI.

SUMMARY

A method for displaying medical image data includes receiving medical image data including the myocardium. An endocardial contour is automatically segmented from the received medical image data. A center of mass of the automatically segmented endocardial contour is determined. A plurality of equiangular projections is defined beginning from the center of mass and projecting outwardly and cross the endocardial contour. A plurality of projections normal to the endocardial contour that correspond to the plurality of equiangular projections is defined. Each normal projection begins from an end of a corresponding equiangular projection and extends for a predetermined length, crossing the endocardial contour at a right angle. The size of the myocardium along each normal projection is displayed as a function of time such that the dynamics of the tissue may be observed. Each of the above steps are performed by one or more image processing devices.

The medical image data may be acquired from an MRI. The center of mass may be a center of mass of a left ventricle (LV) blood pool. The plurality of equiangular projections may include two or more equiangular projections.

The predetermined length of the normal projections may be equal to a fraction of the length of a diagonal measurement of a region of interest of the medical image data. The predetermined length of the normal projections may be equal to a quarter of the length of a diagonal measurement of a region of interest of the medical image data.

Each normal projection may be defined as a closest possible line to the corresponding equiangular projection that crosses the endocardial contour at a right angle.

The displayed dynamics of the myocardium along each normal projection may constitute an M-mode image. Displaying the dynamics of the myocardium along each normal projection as a function of time may include plotting an intensity profile for each normal projection for each of a sequence of frames. Plotting the intensity profile may include establishing a set of equally spaced points along each normal projection, determining image intensity at each point using interpolation, and plotting the intensity at each equally spaced point. There may be fifty equally spaced points.

A method for displaying medical image data includes receiving medial image data including a structure of interest, automatically creating one or more projections that extend outwardly from a center of mass of the structure of interest and cross a perimeter of the structure of interest at right angle thereto, and displaying the dynamics of the structure of interest along each projection as a function of time, wherein each of the above steps are performed by one or more image processing devices.

The medical image may be a magnetic resonance image (MRI).

The structure of interest may be a left ventricle (LV) blood pool.

The projections may be created by first creating one or more equiangular projections and then for each equiangular projection, creating a corresponding normal projection that extends from an end point of the corresponding equiangular projection for a predetermined length and crosses a perimeter of the structure of interest at a right angle.

The dynamics of the structure of interest along each projection as a function of time may include, for each of a plurality of frames, displaying a one-dimensional set of pixel intensities along the projection as a single line such that a two-dimensional graph is constructed where each column of pixels constitutes a one-dimensional set of intensities for a particular frame.

A method for displaying medical image data includes receiving magnetic resonance (MR) image data, automatically segmenting a structure of interest from the received image data, determining a center of mass of the automatically segmented structure of interest, defining a plurality of equiangular projections that begin from the center of mass and project outwardly and cross the structure of interest, defining a plurality of normal projections that correspond to the plurality of equiangular projections, wherein each normal projection begins from an end of a corresponding equiangular projection and extends for a predetermined length, crossing a perimeter of the structure of interest at a right angle; and displaying an M-mode image along each normal projection. Each of the above steps is performed by one or more image processing devices.

The structure of interest may be a left ventricle (LV) blood pool.

Each normal projection may be defined as a closest possible line to the corresponding equiangular projection that crosses the perimeter of the structure of interest at a right angle.

Displaying the M-mode image may include plotting an intensity profile for each normal projection for each of a sequence of frames.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
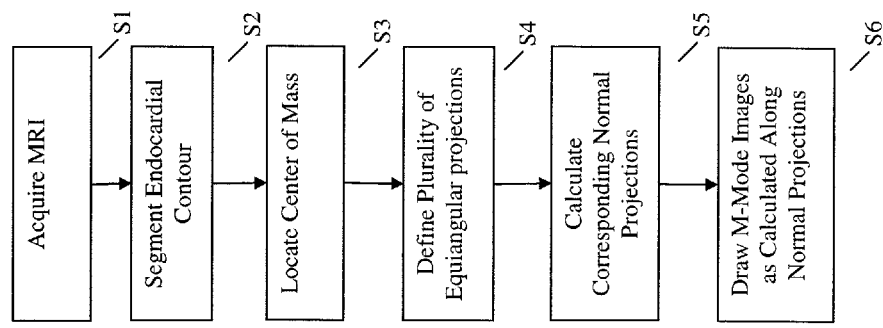
FIG. 1 is a flow chart illustrating an approach for automatically generating a motion-corrected real-time short axis left ventricular images from MRI data according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a rendering of medical image data that is similar to an M-Mode echocardiogram using data obtained from magnetic resonance imaging (MRI). Accordingly, real-time short axis and/or long-axis left ventricular images may be automatically created from MRI data. This automatically generated M-Mode imagery may then be used to provide excellent visibility of the temporal dimension of myocardial regions.

Exemplary embodiments of the present invention may provide a particular approach to automatic generation of real-time short axis left ventricular images from MRI data whereby the M-Mode intensity profile line may be fixed with respect to a particular anatomical location, rather than to a fixed location within the scanning coordinate system. Thus exemplary embodiments of the present invention are able to produce the M-Mode imagery along one or more rays through the myocardial region and then continue to acquire image data in real-time along the same rays, relative to the anatomical structure under investigation, while compensating for motion such as that which is caused by breathing and other patient movement. Accordingly, visibility of the temporal dimension of the myocardial regions may be obtained. Additionally, these regions may be mapped into known segments, for example, as defined by the American Heart Association Segment Model discussed in Manuel D. Cerqueira, MD, et al., *Standardized Myocardial Segmentation and Nomenclature for Tomographic Imaging of the Heart*: A Statement for Healthcare Professionals From the Cardiac Imaging Committee of the Council on Clinical Cardiology of the American Heart Association, American Heart Association 2002, which is hereby incorporated by reference.

The automatically generated M-Mode images may then be used to provide useful diagnostic information and may further be used by automatic segmentation approaches to automatically extract cardiac function information.

Figure 2C:
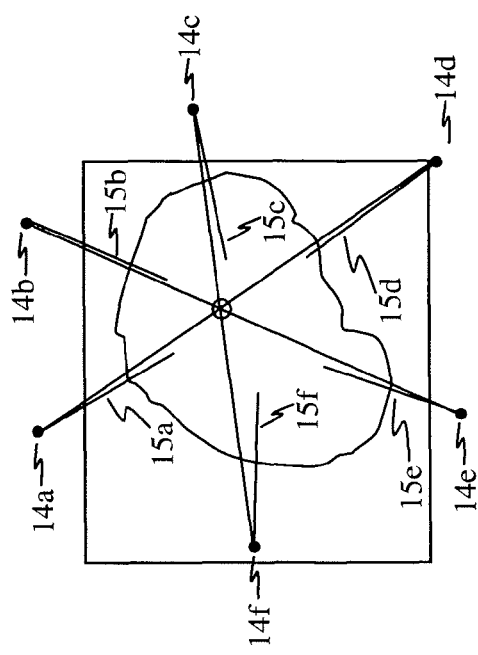
FIG. 2 is a series of diagrams representing MR image data and the performance of an approach for automatically generating M-mode images from MR image data according to an exemplary embodiment of the present invention.

FIG. 1 is a flow chart illustrating an approach for automatically generating a motion-corrected real-time short axis left ventricular images from MRI data according to an exemplary embodiment of the present invention. FIG. 2 is a series of diagrams representing MR image data and the performance of an approach for automatically generating M-mode images from MR image data according to an exemplary embodiment of the present invention. FIG. 3 is an example of M-mode imagery produced using an approach for automatically generating M-mode images from MR image data according to an exemplary embodiment of the present invention. First, magnetic resonance (MR) image data may be acquired (Step S1). The MR image data may be acquired, for example, from an MRI scanner and may be two or three-dimensional image data. Where the MR image data is three-dimensional, an image slice that clearly illustrates the chambers of the heart may be selected. This image slice may be, for example, a short axial view including the LV. The MR image data may be acquired continuously over a length of time so that the resulting M-Mode display may be provided in real-time. It is not necessary, however, that the MR image data be acquired directly from the MR scanner. The MR image data may instead be received from an intervening source. Next, the endocardial contour may be automatically segmented (Step S2). Segmentation of the endocardial contour may be performed using known techniques for automatic segmentation. Segmentation of the endocardial contour may include identifying the bounds of the left ventricle (LV) blood pool. FIG. 2A is a diagram illustrating a sample MR image slice 10 showing a segmented LV blood pool 11 of the endocardial contour. The endocardial center of mass 12 may then be determined (Step S3) based on the segmentation of the endocardial contour. As the endocardial contour may define the LV blood pool, the endocardial center of mass 12 may be substantially equal to the center of the LV blood pool.

Next, a plurality of equiangular projections originating from the endocardial center of mass may be defined within the image space (Step S4). There may be any number of equiangular projections; there may even be only one projection. The number of projections may be equal to the number of M-mode images that are desired during a particular period of time. As each M-mode image shows cardiac motion within a one-dimensional ray over time, multiple such M-mode images may be desired to visualize cardiac motion from multiple rays. According to one exemplary embodiment of the present invention, six M-mode images may be desired showing motion over time along six corresponding rays. Accordingly, six equiangular projections 13a-13f are shown in FIG. 2B originating from the endocardial center of mass 12 and extending past the boundary of the LV blood pool 11.

As exemplary embodiments of the present invention may utilize arbitrarily drawn equiangular projections. However, because one or more of the projections might not be perpendicular to the surface of the myocardial wall, a number of normal projections may be defined (Step S5). As can be seen in FIG. 2C, each of the equiangular projections 13a-13f has an end point (14a-14f) that is located outside of the myocardial wall. For each equiangular projection (13a-13f), a corresponding normal projection (15a-15f) may be defined beginning from a corresponding end point (14a-14f) of the equiangular projection (13a-13f) and crossing the myocardial wall boundary 11 perpendicularly. The normal projection (15a-15f) may extend for a predetermined length l. For example, equiangular projection 13a has an endpoint 14a from which a corresponding corrected projection 15a begins and is defined to cross the myocardial wall boundary 11 at a right angle for a predetermined length l.

Figure 2D:
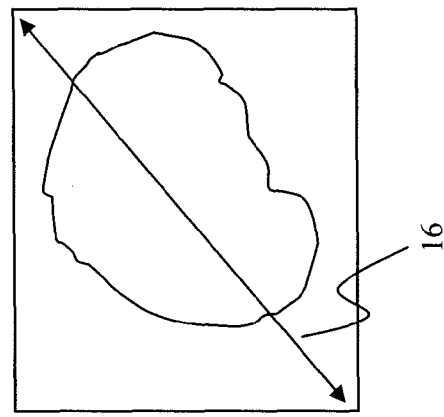
Figure 3:
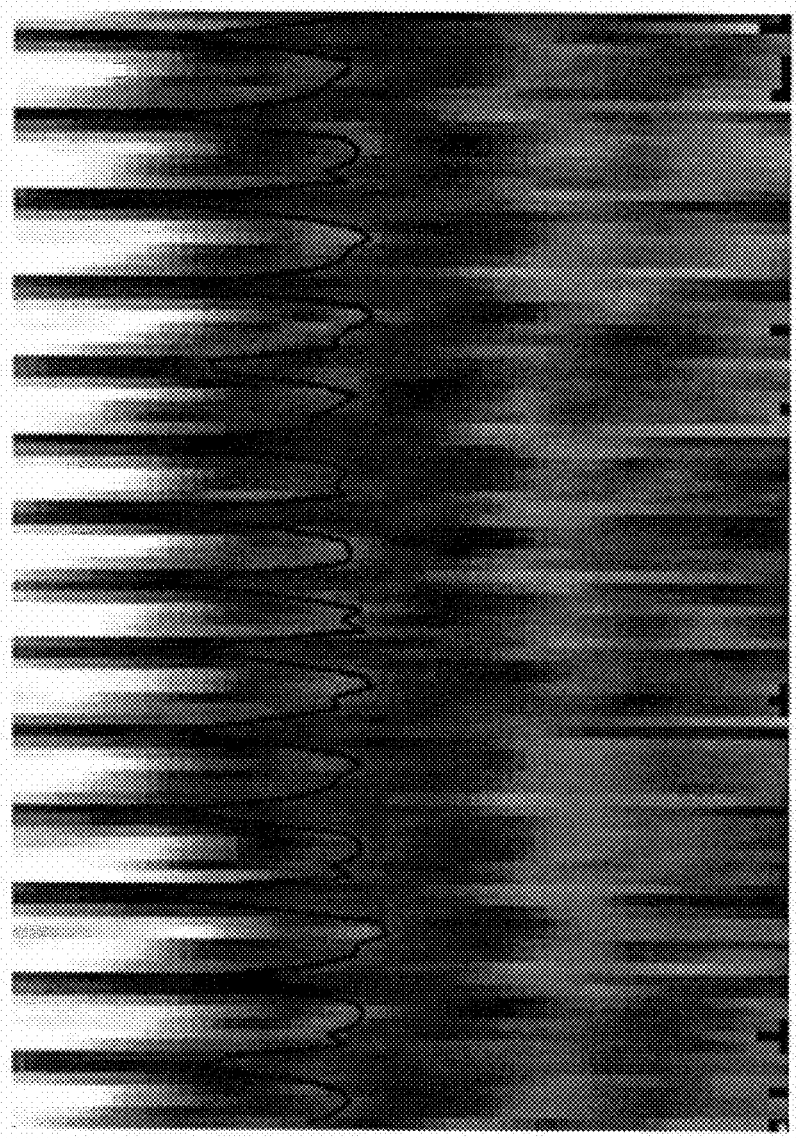
FIG. 3 is an example of M-mode imagery produced using an approach for automatically generating M-mode images from MR image data according to an exemplary embodiment of the present invention.

The predetermined length l may be defined, for example, as l=d/4 where d is a predefined length, for example, the diagonal distance across the entire field of the region of interest (16, as shown in FIG. 2D).

A normal projection may be defined for each equiangular projection, even where the equiangular projection crosses the myocardial wall boundary at a right angle. In such a case, the normal projection begins at the endpoint of the corresponding equiangular projection and follows along the equiangular projection for the predetermined length l. Otherwise, the normal projection may be defined as the closest possible line to the equiangular projection that crosses the myocardial wall boundary at a right angle.

After the normal projections have been defined, M-mode images may be created (Step S6). Creation of each M-mode image may be accomplished by looking along each normal projection over a period of time defined from a time 0 to a time t and graphing the image intensity values along the normal projection for each image frame. A set of M-mode pixels may be defined along the normal projection, for example, the normal projection may be divided into 50 equally spaced M-mode pixels. Where the M-mode pixels do not exactly fall on image pixels of the MR image, linear interpolation may be used to find the intensity value for the M-mode pixels based on the surrounding image pixels. The M-mode image may be plotted as the intensity profile along the normal beam at each of the M-mode pixels over the desired period of time. FIG. 3 is an example of an M-mode image so produced.

Figure 4:
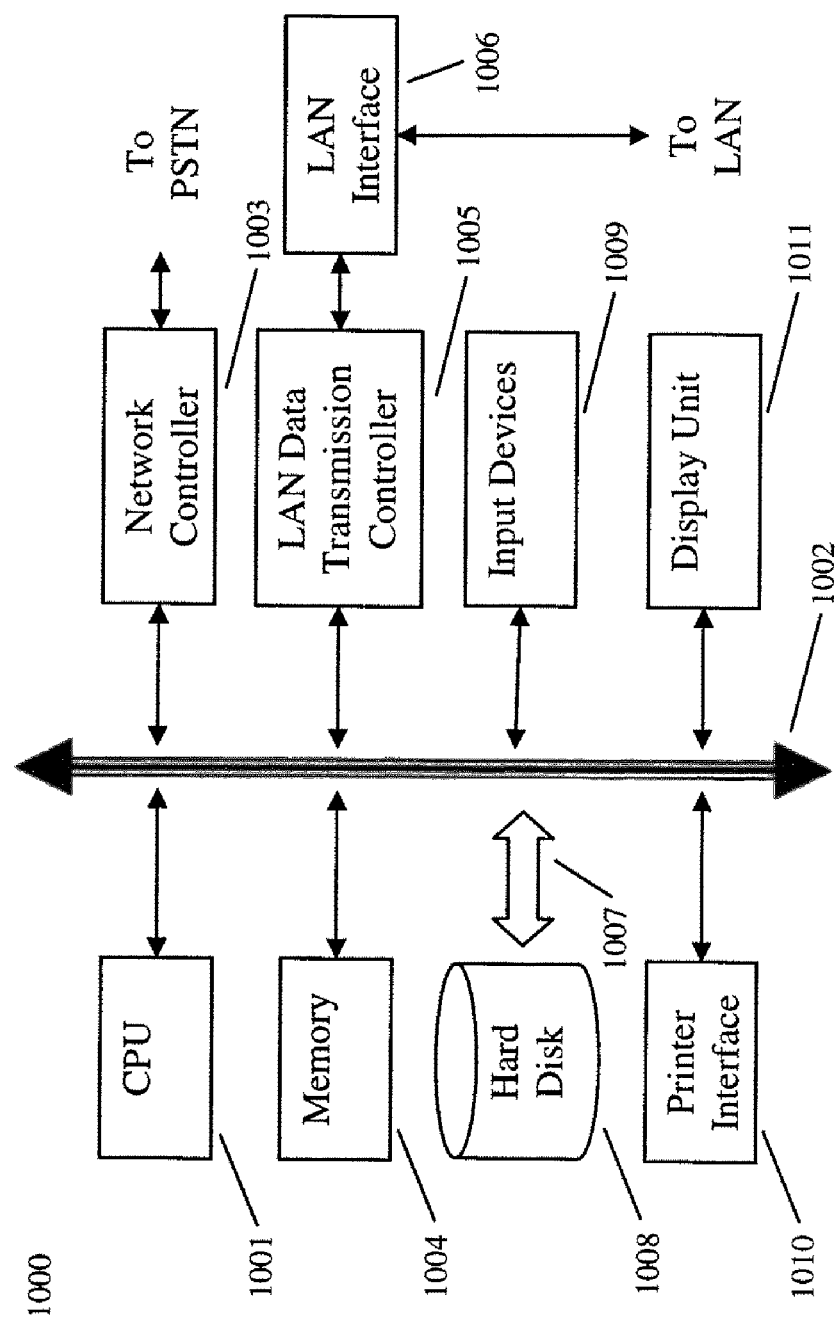
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for displaying medical image data, comprising:
   receiving medical image data including a myocardium;
   automatically segmenting an endocardial contour from the received medical image data;
   determining a center of mass of the automatically segmented endocardial contour;
   defining a plurality of equiangular projections that are equiangular with respect to each other, begin from the center of mass, project outwardly from the center of mass, cross the endocardial contour, and end at a point beyond the endocardial contour;
   defining a plurality of normal projections that correspond to the plurality of equiangular projections, wherein each normal projection begins from the end point of a corresponding equiangular projection and extends for a predetermined length, and each normal projection is defined as the closest possible line to the corresponding equiangular projection that crosses the endocardial contour at a right angle; and
   displaying dynamics of the myocardium along each normal projection as a function of time, wherein each of the above steps are performed by one or more image processing devices.

2. The method of claim 1, wherein displaying a change in size of the myocardium along each normal projection as a function of time includes plotting an intensity profile for each normal projection for each of a sequence of frames.

3. The method of claim 2, wherein plotting the intensity profile includes establishing a set of equally spaced points along each normal projection, determining image intensity at each point using interpolation, and plotting the intensity at each equally spaced point.

4. The method of claim 3, wherein there are fifty equally spaced points.

5. The method of claim 1, wherein the predetermined length of the normal projections is equal to a fraction of the length of a diagonal measurement of a region of interest of the medical image data.

6. The method of claim 5, wherein the predetermined length of the normal projections is equal to a quarter of the length of a diagonal measurement of a region of interest of the medical image data.

7. The method of claim 1, wherein the medical image data is acquired from an MRI.

8. The method of claim 1, wherein the center of mass is a center of mass of a left ventricle (LV) blood pool.

9. The method of claim 1, wherein the plurality of equiangular projections includes two, three, four, five, or six equiangular projections.

10. The method of claim 1, wherein a displayed change in size of the myocardium along each normal projection constitutes an M-mode image.

11. A method for displaying medical image data, comprising:
   receiving magnetic resonance (MR) image data;
   automatically segmenting a structure of interest from the received image data;
   determining a center of mass of the automatically segmented structure of interest;
   defining a plurality of equiangular projections that are equiangular with respect to each other, begin from the center of mass, project outwardly from the center of mass, cross the perimeter of the structure of interest, and end at a point beyond the structure of interest;

defining a plurality of normal projections that correspond to the plurality of equiangular projections, wherein each normal projection begins from the end point of a corresponding equiangular projection and extends for a predetermined length, and each normal projection is defined as the closest possible line to the corresponding equiangular projection that crosses the perimeter of the structure of interest at a right angle; and displaying an M-mode image along each normal projection, wherein each of the above steps are performed by one or more image processing devices, wherein the structure of interest is an endocardial contour.

12. The method of claim 11, wherein the structure of interest is a left ventricle (LV) blood pool.

13. The method of claim 11, wherein displaying the M-mode image includes plotting an intensity profile for each normal projection for each of a sequence of frames.

* * * * *